(12) United States Patent
Khafizova

(10) Patent No.: US 9,386,256 B1
(45) Date of Patent: Jul. 5, 2016

(54) SYSTEMS AND METHODS FOR IDENTIFYING A SET OF CHARACTERS IN A MEDIA FILE

(75) Inventor: Margarita Khafizova, Plano, TX (US)

(73) Assignee: Open Invention Network LLC, Durham, NC (US)

( * ) Notice: Subject to any disclaimer, the term of this patent is extended or adjusted under 35 U.S.C. 154(b) by 1373 days.

(21) Appl. No.: 12/770,965

(22) Filed: Apr. 30, 2010

Related U.S. Application Data

(60) Provisional application No. 61/317,741, filed on Mar. 26, 2010, provisional application No. 61/317,744, filed on Mar. 26, 2010, provisional application No. 61/317,793, filed on Mar. 26, 2010, provisional application No. 61/317,800, filed on Mar. 26, 2010, provisional application No. 61/317,812, filed on Mar. 26, 2010, provisional application No. 61/317,827, filed on Mar. 26, 2010.

(51) Int. Cl.
*G06F 3/00* (2006.01)
*H04N 5/445* (2011.01)

(52) U.S. Cl.
CPC .................................. *H04N 5/44543* (2013.01)

(58) Field of Classification Search
USPC ........................................................ 715/716
See application file for complete search history.

(56) References Cited

U.S. PATENT DOCUMENTS

| | | | |
|---|---|---|---|
| 3,965,484 A * | 6/1976 | Matz et al. | 360/61 |
| 5,337,258 A | 8/1994 | Dennis | |
| 6,728,753 B1 | 4/2004 | Parasnis et al. | |
| 2006/0037051 A1 | 2/2006 | McDowell et al. | |
| 2006/0037053 A1 | 2/2006 | McDowell et al. | |
| 2007/0250777 A1* | 10/2007 | Chen et al. | 715/723 |
| 2008/0255837 A1* | 10/2008 | Kahn et al. | 704/235 |
| 2011/0022387 A1* | 1/2011 | Hager | 704/235 |
| 2011/0113333 A1* | 5/2011 | Lee et al. | 715/716 |
| 2012/0005034 A1* | 1/2012 | Jarman et al. | 705/26.1 |

OTHER PUBLICATIONS

Giovanni Novelli, Giuseppe Pappalardo, Corrado Santoro, Emiliano Tramontana, Technical Paper, "A Grid-based Infrastructure to Support Multimedia Content Distribution", 2007.

Rakesh Mohan, John R. Smith, Chung-Sheng Li, Technical Paper, "Adapting Multimedia Internet Content for Universal Access", IEEE Transactions on Multimedia, vol. 1, No. 1, Mar. 1999.

Armando Fox, Steven D. Gribble, Yatin Chawathe, Eric A Brewer, Technical Paper, "Adapting to Network and Client Variation Using Infrastructural Proxies: Lessons and Perspectives", IEEE Personal Communications, Aug. 1998.

(Continued)

*Primary Examiner* — Angie Badawi
(74) *Attorney, Agent, or Firm* — Haynes and Boone, LLP

(57) ABSTRACT

The illustrative embodiments described herein provide systems and methods for notifying a user when a set of characters are identified in a media file. In one embodiment, a method includes receiving a set of characters inputted by the user of a computing device, playing the media file, transcribing the media file to form a transcription, and determining whether the transcription of the media file includes the set of characters. The method also includes initiating a notification prompt on a graphical user interface of the computing device in response to determining that the media file includes the set of characters.

20 Claims, 5 Drawing Sheets

(56) References Cited

OTHER PUBLICATIONS

Tu, Y.-C. Yan, J. Shen, G. Sunil Prabhakar, Technical Paper,—"Multiquality Data Replication in Multimedia Databases", IEEE Transactions on Knowledge and Data Engineering, vol. 19, No. 5, May 2007.

Smith, J.R. Mohan, R. Chung-Sheng Li, Technical Paper, "Transcoding Internet content for heterogeneous client devices", IEEE, 1998.

* cited by examiner

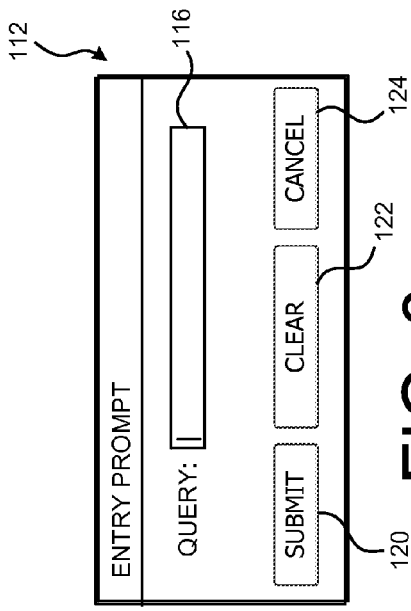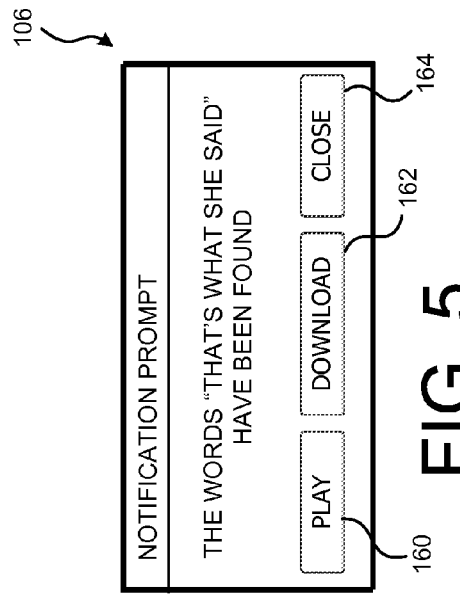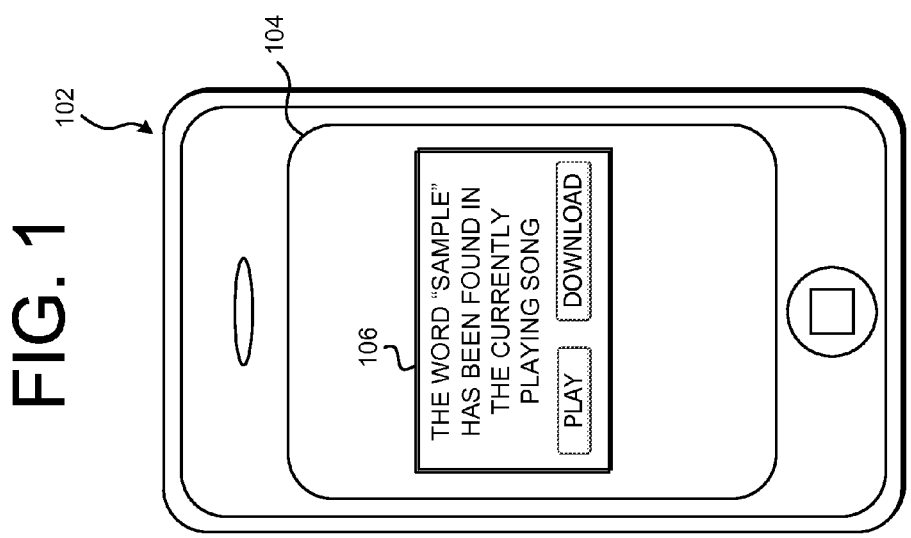

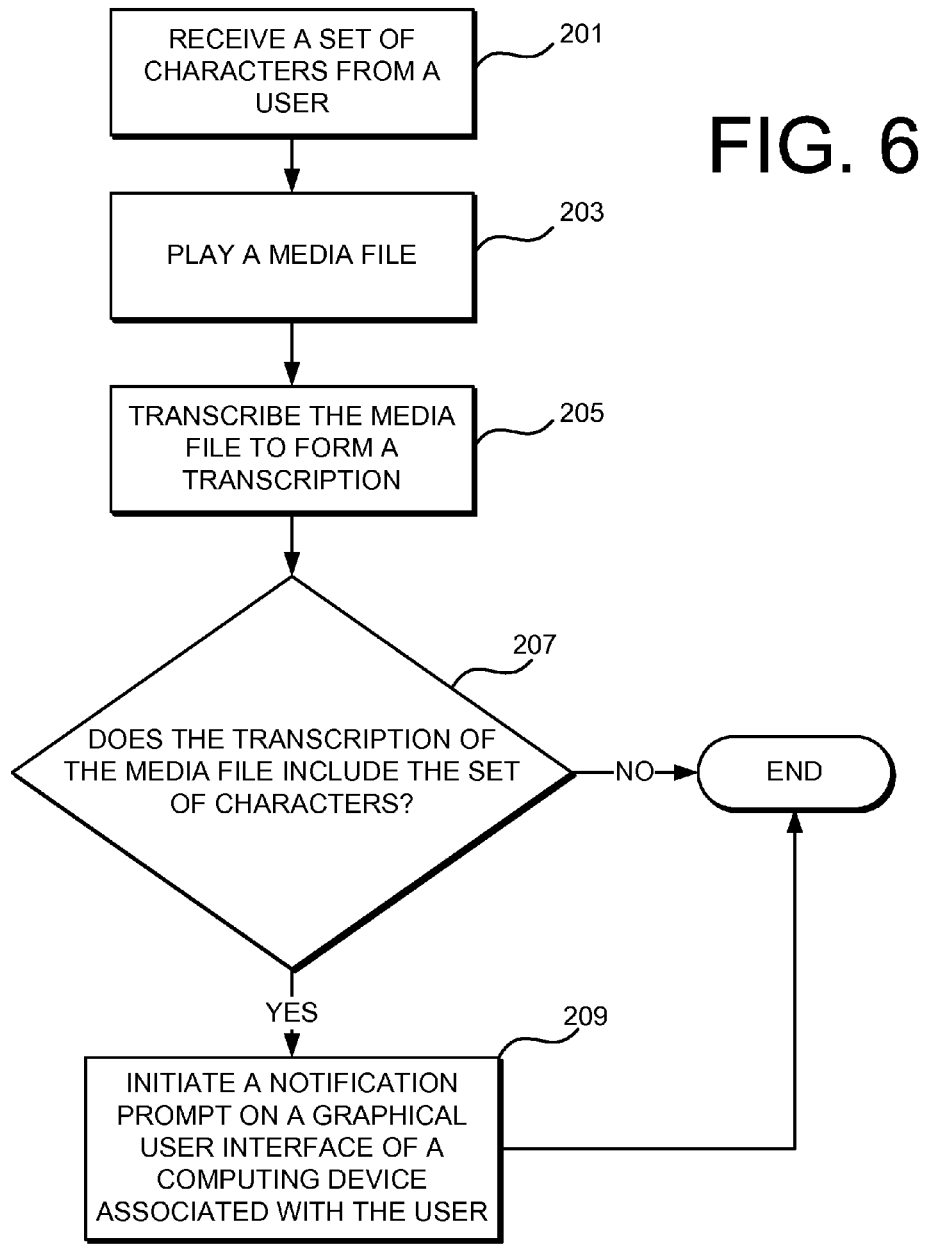

SYSTEMS AND METHODS FOR IDENTIFYING A SET OF CHARACTERS IN A MEDIA FILE

CROSS-REFERENCE TO RELATED APPLICATIONS

This application relates to U.S. Provisional Application Ser. No. 61/317,741, filed on Mar. 26, 2010 and U.S. application Ser. No. 12/753,163 filed on Apr. 2, 2010 and U.S. Ser. No. 12/753,167 filed on Apr. 2, 2010 and U.S. Ser. No. 12/753,171 filed on Apr. 2, 2010 and U.S. Ser. No. 12/753,180 filed on Apr. 2, 2010 and U.S. Provisional Application Ser. No. 61/317,744 filed on Mar. 26, 2010 and U.S. Provisional Application Ser. No. 61/317,793 filed on Mar. 26, 2010 and U.S. Provisional Application Ser. No. 61/317,800 filed on Mar. 26, 2010 and U.S. Provisional Application Ser. No. 61/317,812 filed on Mar. 26, 2010 and U.S. Provisional Ser. No. 61/317,827 filed on Mar. 26, 2010.

BACKGROUND

1. Field of the Invention

The present invention relates generally to systems and methods for identifying a set of characters. More particularly, the present invention relates to identifying a set of characters in one or more media files.

2. Description of the Related Art

As higher volumes of data are able to be stored and transmitted within and across computer systems, media files (e.g., audio files, video files, audio/video files, etc.) have become a daily part of our lives. The rise of MP3 players and websites such as YouTube® are examples of how media files have become ingrained in our society. Media files often contain human speech, such as the sung lyrics of a song or human dialogue in a video. Current users of media files may have no convenient way of being notified when a media file contains particular characters or words. In addition, current systems may not be able to identify user-defined characters or words in a playing media file. For example, a user may want to know whether a media file playing on his or her computer or other device contains a particular phrase, but current systems may not be able to identify such user-defined phases or provide notification to the user when the phrase is found in the media file.

SUMMARY

The illustrative embodiments described herein are directed to a data processing system and, in particular, to systems and methods for notifying a user when a set of characters are identified in a media file. In one embodiment, a method includes receiving a set of characters inputted by the user of a computing device, playing the media file, transcribing the media file to form a transcription, and determining whether the transcription of the media file includes the set of characters. The method also includes initiating a notification prompt on a graphical user interface of the computing device in response to determining that the media file includes the set of characters.

In another embodiment, a system for notifying a user when a set of words is identified in a media file includes a transcription module to transcribe the media file to form a transcription, and an identification module to identify a segment of the media file that includes a user-defined set of words. The identification module uses the transcription to identify the segment of the media file that includes the user-defined set of words. The system also includes a notification module to notify the user in response to identifying the segment of the media file that includes the user-defined set of words.

In another embodiment, a computing device includes a bus system and a memory connected to the bus system. The memory includes a set of instructions. The data processing system includes a processing unit connected to the bus system. The processing unit executes the set of instructions to receive a set of characters inputted by a user of a computing device, play a media file, and transcribe the media file to form a transcription. The processing unit also executes the set of instructions to identify a beginning time point of a segment of the media file containing the set of characters. The transcription is used to identify the beginning time point. The processing unit also executes the set of instructions to identify an ending time point of the segment of the media file containing the set of characters. The transcription is used to identify the ending time point. The processing unit also executes the set of instructions to store the beginning time point and the ending time point in the memory.

BRIEF DESCRIPTION OF THE DRAWINGS

FIG. 1 is schematic pictorial representation of a computing device on which the illustrative embodiments may be implemented;

FIG. 3 is a schematic, pictorial representation of an entry prompt according to an illustrative embodiment;

FIG. 5 is a schematic, pictorial representation of a notification prompt according to an illustrative embodiment;

FIG. 6 is a schematic flowchart of a process for notifying a user when a set of characters is identified in a media file according to an illustrative embodiment;

DETAILED DESCRIPTION

Figure 2:
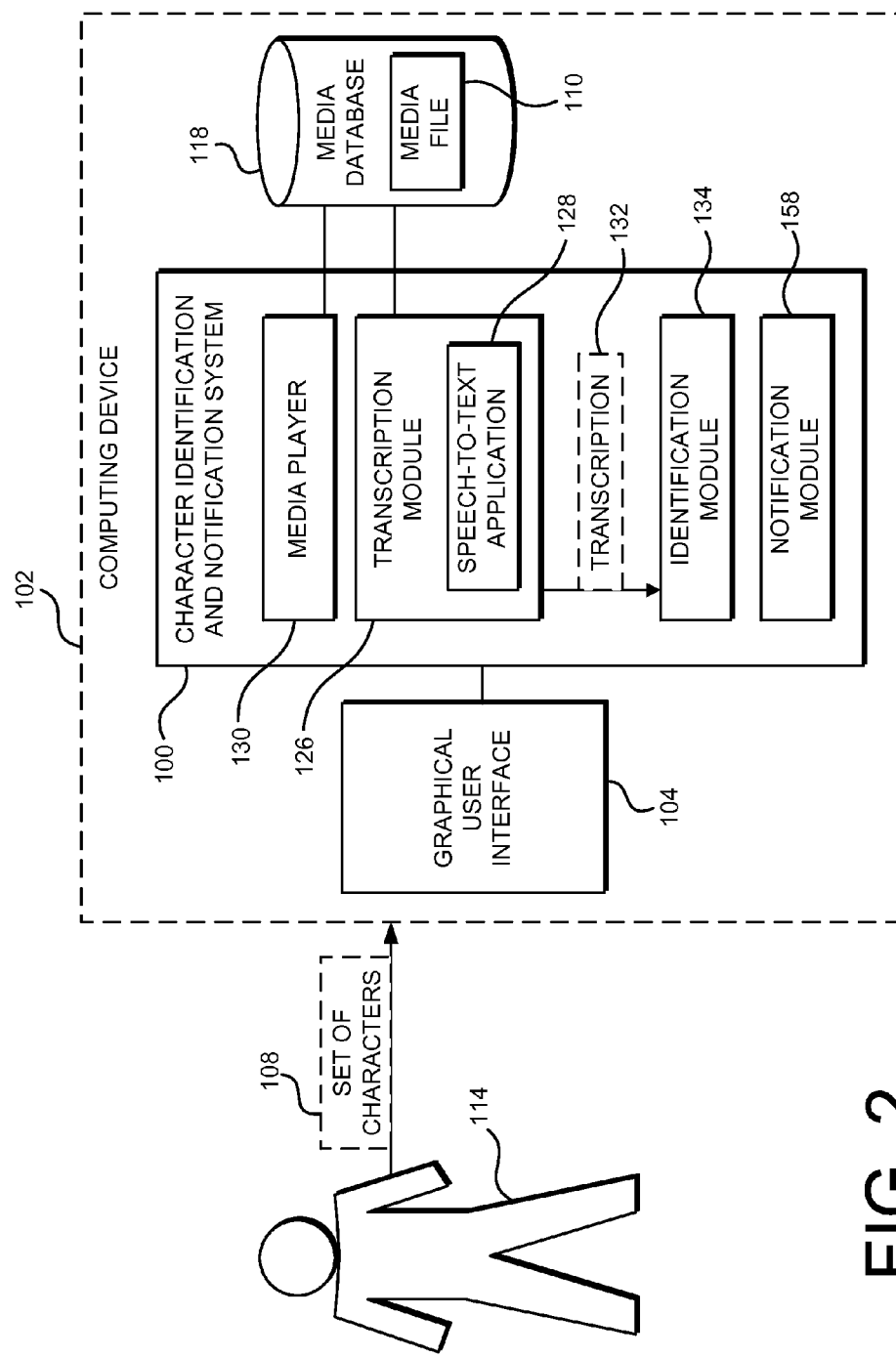
FIG. 2 is a schematic, block diagram of a character identification and notification system according to an illustrative embodiment.

Referring to FIGS. 1-5, an illustrative embodiment of a character identification and notification system 100 implemented on a computing device 102 is shown. Although the computing device 102 is a cellular phone in the example of FIG. 1, the computing device 102 may be any device capable of processing data, such as a smart phone, walkie talkie, netbook, personal digital assistant, mini-computer, digital music player, digital reader, portable gaming device, web browsing device, etc. The computing device 102 includes a graphical user interface 104 on which a notification prompt 106 may be displayed when a set of characters 108 is identified in a media file 110. The media file may be any file that contains audio, such as audio files, video files, or audio/video files. Unless otherwise indicated, as used herein, "or" does not require mutual exclusivity. Non-limiting examples of the media file 110 include an MP3 file, an MPEG file, an AVI file, a WAV file, etc. The media file 110 may be concurrently playing while the set of characters 108 is identified in the media file 110 and a notification is generated. The set of characters 108 may be one or more characters in any language or character set, including a word, a phrase, etc. In an example in which the set of characters 108 is a set of words, the set of words may include one or more words.

In one embodiment, the character identification and notification system 100 initiates an entry prompt 112 on the graphical user interface 104, and a user 114 inputs the characters 108 in a query field 116 on the entry prompt 112. The entry prompt 112 is shown in FIG. 3 according to an illustrative embodiment. The characters 108 entered in the query field 116 may be, for example, a word that the user 114 would like to be identified in the media file 110, or in any of the media files contained in a media database 118. Upon entering the characters 108 in the query field 116 of the entry prompt 112, the user 114 may select a submit button 120, which causes the characters 108 to be submitted to the character identification and notification system 100. The user 114 may also select a clear button 122 that clears the query field 116. The entry prompt 112 also includes a cancel button 124 that closes the entry prompt 112.

In one embodiment, the character identification and notification system 100 includes a transcription module 126 that transcribes the media file 110 by converting speech, or audio, in the media file 110 into text. The transcription module 126 may include, or work with, a speech-to-text application 128. In one non-limiting example, the speech-to-text application 128 may originate from an outside, or third-party, source, such as Nuance's Dragon® NaturallySpeaking® speech recognition software, YouTube®, or any other voice recognition software or software source.

In one embodiment, a media player 130 plays the media file 110 as the transcription module 126 transcribes the media file 110. By way of specific example, if the computing device 102 is an MP3 player and the media file 110 is an MP3 file, the media player 130 may play the MP3 file while the transcription module 126 transcribes the MP3 file. As described below, the user 114 may be notified as to whether the currently playing media file 110 contains the characters 108.

In another embodiment, the transcription module 126 transcribes any or all of the media files contained in the media database 118 regardless of whether the media files contained in the media database are being played by the media player 130. This embodiment may be used, for example, when the user 114 desires to know whether or not the media contained in the media database 118 includes the characters 108. Thus, the user 114 is able to know whether or not the media in the media database 118 includes the characters 108 even if the media contained in the media database 118 is not currently playing.

The transcription module 126 transcribes the media file 110 to form a transcription 132 of the media file 110. The character identification and notification system 100 includes an identification module 134, which uses the transcription 132 of the media file 110 to determine whether the media file 110 includes the characters 108. In one embodiment, the identification module 134 determines whether the transcription 132 includes the characters 108. In another embodiment, the identification module 134 uses the transcription 132 to identify one or more segments of the media file 110 that include the characters 108. The identification module 134 may also identify a beginning time point and ending time point for each of the segments identified that includes the characters 108.

Figure 4:
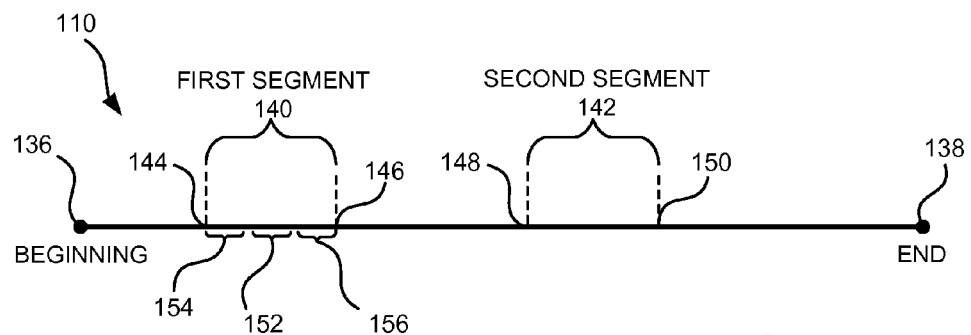
FIG. 4 is a schematic diagram representing a media file in which a first segment and a second segment are identified according to an illustrative embodiment.

An example of identifying one or more segments of the media file 110 that contain the characters 108 is shown with particular reference to FIG. 4. FIG. 4 is a schematic representation of the span of the media file 110 over time, which includes the beginning 136 and the end 138 of the media file 110. In the example of FIG. 4, the identification module 134 identifies a first segment 140 and a second segment 142 as containing the characters 108. For example, if the user 114 enters and submits the word "money" using the entry prompt 112, the identification module 134 may identify the first segment 140 and the second segment 142 as being the segments of the media file 110 that include the word "money". The identification module 134 uses the transcription 132 of the media file 110 to determine the segments of the media file 110 that include the characters 108.

In one embodiment, the identification module 134 identifies a beginning time point 144, 148 and an ending time point 146, 150 of each segment in the media file 110 in which the characters 108 occur. The beginning time point 144, 148 and the ending time point 146, 150 may be stored in a memory, and may be referenced at a later time. In one non-limiting example, the beginning and ending time points 144, 146, 148, 150 are expressed as elapsed, or remaining, times within the total time span of the media file 110. In the example of FIG. 4, the identification module 134 identifies the first segment 140 as having the beginning time point 144 and the ending time point 146, and the second segment 142 as having the beginning time point 148 and ending time point 150.

Another illustrative embodiment is shown with respect to the first segment 140 in FIG. 4. In this embodiment, the characters 108 occur within a sub-segment 152 of the first segment 140. Also in this embodiment, the identification module 134 identifies the beginning time point 144 to be a first time period 154 before the sub-segment 152. The identification module 134 may also identify the ending time point 146 to be a second time period 156 after the sub-segment 152. The first time period 154 and the second time period 156 may be any predetermined time period, and may be selected by the user 114. By including the first time period 154 and the second time period 156, a "buffer time zone" may be added before and after the occurrence of the characters 108 within the media file 110. Such a buffer time zone may be useful, for example, when playing back the first segment 140 of the media file 110 using the media player 130.

As discussed above, the identification module 134 may identify the first segment 140 and the second segment 142 at the same time that the media player 130 plays the media file 110. In one embodiment, the identification module 134 may also monitor all media files played thereafter by the media player 130, and determine whether the subsequently-played media files contain the characters 108. Such subsequently-played media files may include any media files that are played after the user 114 submits the characters 108. The identification module 134 may also identify any segments in those subsequently-played media files that contain the characters 108.

In another embodiment, segments of any or all media files in the media database 118 may be identified by the identification module 134 using transcriptions of the media files that are generated by the transcription module 126. In this embodiment, segments may be identified regardless of whether the associated media file is currently playing. In one specific non-limiting example, the user 114 may desire to know whether the characters 108 are included in the media files contained in a particular directory, or storage unit, of his or her computing device 102. In this example, the identification module 134 may identify or report any occurrences of the characters 108 in the media files contained in the directory, as well as the media file segments in which the characters 108 occur.

In one embodiment, upon determining that the media file 110 includes the characters 108, or upon identifying the segment(s) of the media file 110 that include the characters 108, a notification module 158 may notify the user 114. For example, the notification module 158 may notify the user 114 using an audio or visual alert. In one embodiment, the notification module 158 initiates the notification prompt 106 on the graphical user interface 104. A non-limiting example of the notification prompt 106 is shown in FIG. 5. The possible graphical elements of the notification prompt 106 are numerous. For example, the notification prompt 106 may show the characters 108, the name of the media file 110, the length of the media file 110, the time span of the first segment 140 or the second segment 142, the beginning time points 144, 148 and the ending time points 146, 150 of the first segment 140 or the second segment 142, respectively, etc. A notification prompt 106 having slightly different graphical elements is shown in FIG. 1.

The notification prompt 106 may also include a play button 160, which causes the computing device 102 to play the identified segment of the media file 110. The notification prompt 106 may also include a download button 162, which causes the character identification and notification system 100 to initiate downloading of the identified segment. Downloading the identified segment may be useful when the entire media file 110, but no segments thereof, is included on the media database 118. The download function may also be useful when the media database 118 or the media file 110 are not stored on the computing device 102, and are instead located at a remote location, such as across the Internet. In one example, the user 114 may download the first segment 140 or the second segment 142 instead of or in addition to, the media file 110. The notification prompt 106 may also include a close button 164, which closes the notification prompt 106.

Although the character identification and notification system 100 is shown to be implemented on the computing device 102, the character identification and notification system 100, as well as the media database 118, may be included on a remote computer and connected to the computing device 102 via a network connection, including over the Internet. In another embodiment, the character identification and notification system 100 is an application that may be downloaded from a server over a wireless network, such as the Internet. Also, the media player 130 may be separate from the character identification and notification system 100, and may be a media player that originates from a third party, such as Microsoft®.

The illustrative embodiments may be used to notify the user 114 when a word or phrase is spoken, or otherwise contained, in his or her songs, movies, or TV episodes. Identifying such user-defined words or phrases can help to identify recurring story lines in the user's media. Identifying such user-defined words or phrases may also link seemingly dissimilar media files, such as when the character identification and notification system 100 identifies a phrase that is normally heard in a particular TV episode in an unrelated song.

Referring to FIG. 6, an illustrative embodiment of a process that may be executed by the character identification and notification system 100 in FIG. 3 includes receiving a set of characters from a user (step 201). The process includes playing a media file (step 203). In an alternate embodiment, step 203 is not included in the process.

The process also transcribes the media file to form a transcription (step 205). The process determines if the transcription of the media file includes the set of characters (step 207). If the transcription of the media file does not include the set of characters, the process terminates.

Figure 7:
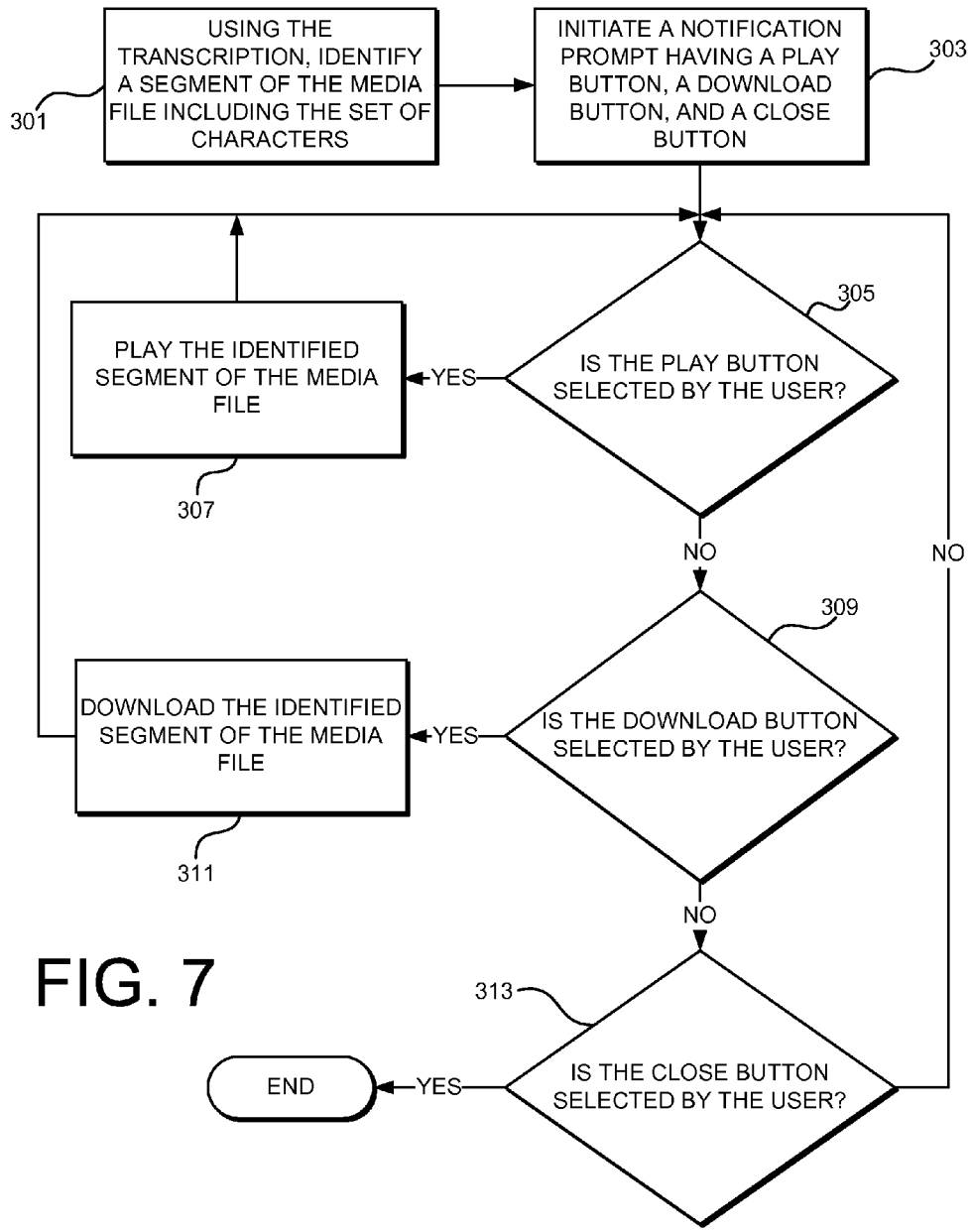
FIG. 7 is a schematic flowchart of a process for notifying a user when a set of characters is identified in a media file according to another illustrative embodiment.

If the process determines that the transcription of the media file includes the set of characters, the process initiates a notification prompt on the graphical user interface of a computing device associated with the user (step 209). The process then terminates Referring to FIG. 7, an illustrative embodiment of a process that may be executed by the character identification and notification system 100 in FIG. 3 is shown. The process of FIG. 7 shows one non-limiting example of the implementation of steps 207 and 209 in FIG. 6. The process in FIG. 7 includes using the transcription to identify a segment of the media file that includes the set of characters (step 301). The process initiates a notification prompt that has a play button, a download button, and a close button (step 303). However, as mentioned above, the graphical elements of the notification prompt can vary.

The process determines whether the play button has been selected by the user (step 305). If the process determines that the play button has been selected by the user, the process plays the identified segment of the media file (step 307). The process then returns to step 305.

Returning to step 305, if the process determines that the play button has not been selected by the user, the process determines if the download button has been selected by the user (step 309). If the process determines that the download button has been selected by the user, the process downloads the identified segment of the media file (step 311). The process then returns to step 305.

Returning to step 309, if the process determines that the download button has not been selected by the user, the process determines whether the close button has been selected by the user (step 313). If the process determines that the close button has not been selected by the user, the process returns to step 305. If the process determines that the close button has been selected by the user, the process then terminates.

The flowcharts and block diagrams in the different depicted embodiments illustrate the architecture, functionality, and operation of some possible implementations of apparatus, methods and computer program products. In this regard, each block in the flowchart or block diagrams may represent a module, segment, or portion of code, which comprises one or more executable instructions for implementing the specified function or functions. In some alternative implementations, the function or functions noted in the block may occur out of the order noted in the Figures. For example, in some cases, two blocks shown in succession may be executed substantially concurrently, or the blocks may sometimes be executed in the reverse order, depending upon the functionality involved.

Figure 8:
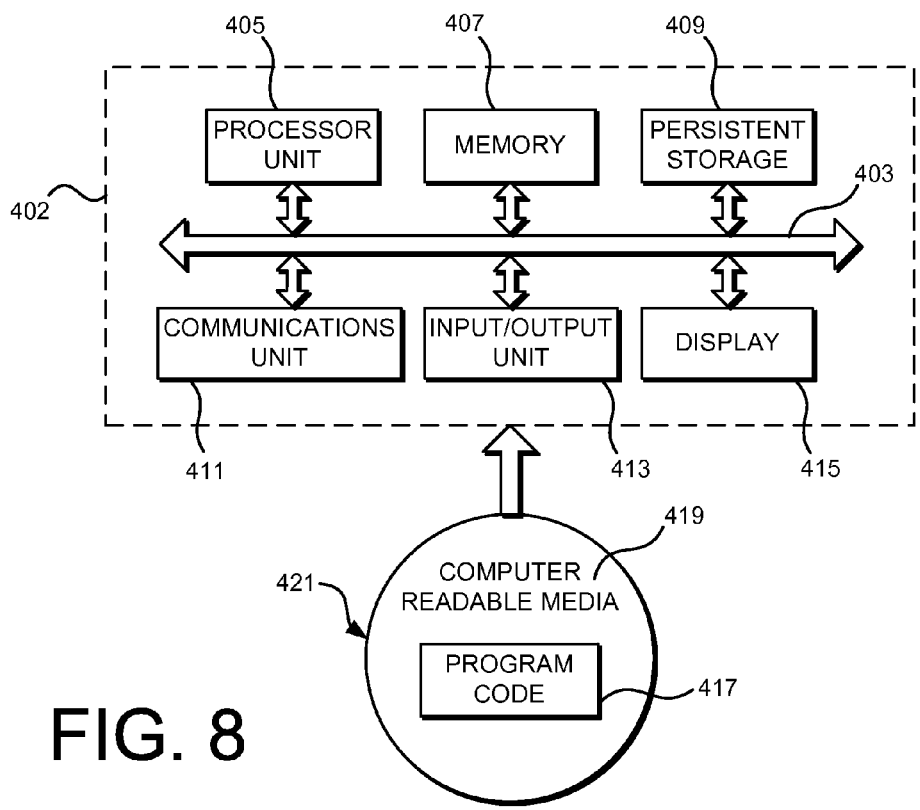
FIG. 8 is a schematic, block diagram of a computing device in which the illustrative embodiments may be implemented.

Referring to FIG. 8, a block diagram of a computing device 402 is shown in which illustrative embodiments may be implemented. The computing device 402 may be the computing device 102 described in FIG. 1 or 2. Computer-usable program code or instructions implementing the processes used in the illustrative embodiments may be located on the computing device 402. The computing device 402 includes a communications fabric 403, which provides communications between a processor unit 405, a memory 407, a persistent storage 409, a communications unit 411, an input/output (I/O) unit 413, and a display 415.

The processor unit 405 serves to execute instructions for software that may be loaded into the memory 407. The processor unit 405 may be a set of one or more processors or may be a multi-processor core, depending on the particular implementation. Further, the processor unit 405 may be implemented using one or more heterogeneous processor systems in which a main processor is present with secondary processors on a single chip. As another illustrative example, the processor unit 405 may be a symmetric multi-processor system containing multiple processors of the same type.

The memory 407, in these examples, may be, for example, a random access memory or any other suitable volatile or non-volatile storage device. The persistent storage 409 may take various forms depending on the particular implementation. For example, the persistent storage 409 may contain one or more components or devices. For example, the persistent storage 409 may be a hard drive, a flash memory, a rewritable optical disk, a rewritable magnetic tape, or some combination of the above. The media used by the persistent storage 409 also may be removable. For example, a removable hard drive may be used for the persistent storage 409. The memory 407 or the persistent storage 409 may be used, for example, to store one or more segments of a media file containing user-definable characters, including the beginning and ending point of such segments.

The communications unit 411, in these examples, provides for communications with other data processing systems or communication devices. In these examples, the communications unit 411 may be a network interface card. The communications unit 411 may provide communications through the use of either or both physical and wireless communication links.

The input/output unit 413 allows for the input and output of data with other devices that may be connected to the computing device 402. For example, the input/output unit 413 may provide a connection for user input through a keyboard and mouse. Further, the input/output unit 413 may send output, such as a processing job, to a processing device. In the case in which the computing device 402 is a cellular phone, the input/output unit 413 may also allow devices to be connected to the cellular phone, such as microphones, headsets, and controllers. The display 415 provides a mechanism to display information to a user, such as a graphical user interface. The display 415 may be the graphical user interface 104 in FIG. 1 or 2, and may be used to display the prompts described in the illustrative embodiments.

Instructions for the operating system and applications or programs are located on the persistent storage 409. These instructions may be loaded into the memory 407 for execution by the processor unit 405. The processes of the different embodiments may be performed by the processor unit 405 using computer-implemented instructions, which may be located in a memory, such as the memory 407. These instructions are referred to as program code, computer-usable program code, or computer-readable program code that may be read and executed by a processor in the processor unit 405. The program code in the different embodiments may be embodied on different physical or tangible computer-readable media, such as the memory 407 or the persistent storage 409.

Program code 417 is located in a functional form on a computer-readable media 419 and may be loaded onto or transferred to the computing device 402 for execution by the processor unit 405. The program code 417 and the computer-readable media 419 form computer program product 421 in these examples. In one embodiment, the computer program product 421 is the character identification and notification system 100 in FIG. 2. In this embodiment, the computing device 402 may be the computing device 102 in FIG. 1 or 2, and the program code 417 may include computer-usable program code capable of receiving a set of characters inputted by the user of a computing device, playing a media file, transcribing the media file to form a transcription, and determining whether the transcription of the media file includes the set of characters. The program code 417 may also include computer-usable program code capable of initiating a notification prompt on a graphical user interface of the computing device in response to determining that the media file includes the set of characters.

In another embodiment, the program code 417 may include computer-usable program code capable of receiving a set of characters inputted by a user of a computing device, playing a media file, and transcribing the media file to form a transcription. The program code 417 may also include computer-usable program code capable of identifying a beginning time point of a segment of the media file containing the set of characters. The transcription may be used to identify the beginning time point. The program code 417 may also include computer-usable program code capable of identifying an ending time point of the segment of the media file containing the set of characters. The transcription may be used to identify the ending time point. The program code 417 may also include computer-usable program code capable of storing the beginning time point and the ending time point in the memory. Any combination of the above-mentioned computer-usable program code may be implemented in the program code 417.

In one example, the computer-readable media 419 may be in a tangible form, such as, for example, an optical or magnetic disc that is inserted or placed into a drive or other device that is part of the persistent storage 409 for transfer onto a storage device, such as a hard drive that is part of the persistent storage 409. In a tangible form, the computer-readable media 419 also may take the form of a persistent storage, such as a hard drive or a flash memory that is connected to the computing device 402. The tangible form of the computer-readable media 419 is also referred to as computer recordable storage media.

Alternatively, the program code 417 may be transferred to the computing device 402 from the computer-readable media 419 through a communication link to the communications unit 411 or through a connection to the input/output unit 413. The communication link or the connection may be physical or wireless in the illustrative examples. The computer-readable media 419 also may take the form of non-tangible media, such as communication links or wireless transmissions containing the program code 417.

The different components illustrated for the computing device 402 are not meant to provide architectural limitations to the manner in which different embodiments may be implemented. The different illustrative embodiments may be implemented in a data processing system including components in addition to or in place of those illustrated for computing device 402. Other components shown in FIG. 8 can be varied from the illustrative examples shown.

As one example, a storage device in the computing device 402 is any hardware apparatus that may store data. The memory 407, the persistent storage 409, and the computer-readable media 419 are examples of storage devices in a tangible form.

In another example, a bus system may be used to implement the communications fabric 403 and may be comprised of one or more buses, such as a system bus or an input/output bus. Of course, the bus system may be implemented using any suitable type of architecture that provides for a transfer of data between different components or devices attached to the bus system. Additionally, the communications unit 411 may include one or more devices used to transmit and receive data, such as a modem or a network adapter. Further, a memory may be, for example, the memory 407 or a cache such as found in an interface and memory controller hub that may be present in the communications fabric 403.

The principles of the present invention can take the form of an entirely hardware embodiment, an entirely software embodiment, or an embodiment containing both hardware and software elements. In one embodiment, the invention is implemented in software, which includes but is not limited to, firmware, resident software, microcode, and other computer readable code.

Furthermore, the principles of the present invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The previous detailed description is of a small number of embodiments for implementing the invention and is not intended to be limiting in scope. One of skill in this art will immediately envisage the methods and variations used to implement this invention in other areas than those described in detail. The following claims set forth a number of the embodiments of the invention disclosed with greater particularity.

What is claimed:

1. A method for notifying a user when a set of characters is identified in a media file, the method comprising:
    receiving a set of characters inputted by the user of a computing device;
    playing the media file;
    transcribing the media file to form a transcription;
    determining whether the transcription of the media file includes the set of characters;
    identifying a sub-segment in which the set of characters occurs, wherein the sub-segment is marked by a beginning time point and an ending time point within a segment; and
    initiating a notification prompt on a graphical user interface of the computing device in response to determining that the media file includes the set of characters.

2. The method of claim 1, further comprising:
    displaying a play button on the notification prompt; and
    playing the segment of the media file that includes the set of characters in response to the user selecting the play button.

3. The method of claim 1, further comprising:
    displaying a download button on the notification prompt; and
    downloading the segment of the media file that includes the set of characters to the computing device in response to the user selecting the download button.

4. The method of claim 1, wherein the set of characters form one or more words.

5. The method of claim 1, wherein playing and transcribing the media file occurs at the same time.

6. The method of claim 1, further comprising:
    initiating an entry prompt on the graphical user interface, wherein the user inputs the set of characters using the entry prompt.

7. The method of claim 1, further comprising:
    transcribing the media file using a speech-to-text application.

8. A hardware-based system for notifying a user when a set of words is identified in a media file, the hardware-based system comprising:
    a transcription module configured to transcribe the media file to form a transcription;
    an identification module configured to identify a segment of the media file comprising a user-defined set of words, the identification module further configured to use the transcription to identify the segment of the media file comprising the user-defined set of words; and
    a notification module configured to notify the user in response to identifying the segment of the media file comprising the user-defined set of words, wherein
    the identification module is further configured to identify a sub-segment in which the set of characters occurs, wherein the sub-segment is marked by a beginning time point and an ending time point within the segment.

9. The hardware-based system of claim 8, further comprising:
    a media database configured to store a set of media files, wherein the media file is included in the set of media files, wherein
    the transcription module is configured to transcribe the set of media files to form transcriptions, and
    the identification module is configured to identify the user-defined set of words in the set of media files using the transcriptions.

10. The hardware-based system of claim 8, further comprising:
    a media player configured to play the media file, wherein the transcription module is configured to transcribe the media file while the media player plays the media file.

11. The hardware-based system of claim 8, wherein the notification module is configured to notify the user using at least one of an audio or visual alert.

12. The hardware-based system of claim 8, wherein the system is implemented on a computing device associated with the user.

13. The hardware-based system of claim 8, wherein the notification module is configured to initiate a notification prompt in response to identify the segment of the media file comprising the user-defined set of words, and the hardware-based system further comprises:
    a graphical user interface configured to display the notification prompt.

14. The hardware-based system of claim 8, wherein the notification module is configured to initiate a notification prompt in response to identifying the segment of the media file comprising the user-defined set of words, the hardware-based system further comprising:
    a graphical user interface configured to display the notification prompt, wherein the graphical user interface is configured to display a play button on the notification prompt, and the segment of the media file comprising the user-defined set of words is played in response to the user selecting the play button.

15. The hardware-based system of claim 8, wherein the notification module is configured to initiate a notification prompt in response to identifying the segment of the media file comprising the user-defined set of words, the hardware-based system further comprising:
    a graphical user interface configured to display the notification prompt, wherein the graphical user interface is configured to display a download button on the notification prompt, and the segment of the media file comprising the user-defined set of words is downloaded in response to the user selecting the download button.

16. A computing device, comprising:
    a bus system;

a memory connected to the bus system, wherein the memory includes a set of instructions; and a processing unit connected to the bus system, wherein the processing unit is configured to execute the set of instructions to:
- receive a set of characters inputted by a user of a computing device;
- play a media file;
- transcribe the media file to form a transcription;
- identify a sub-segment in which the set of characters occurs, wherein the sub-segment is marked by a beginning time point and an ending time point within a segment; and
- store the beginning time point and the ending time point in the memory.

17. The computing device of claim 16, wherein the processing unit is further configured to execute the set of instructions to initiate a notification prompt on a graphical user interface of the computing device in response to identifying the set of characters in the transcription.

18. The computing device of claim 16, wherein the processing unit is further configured to execute the set of instructions to initiate a notification prompt on a graphical user interface of the computing device in response to identifying the set of characters in the transcription, and to display the beginning time point and the ending time point on the notification prompt.

19. The computing device of claim 16, wherein the set of instructions to identify the beginning time point includes instructions to identify the beginning time point that is a first time period before an occurrence of the set of characters in the media file, and to identify the ending time point that is a second time period after the occurrence of the set of characters in the media file.

20. The computing device of claim 16, wherein the processing unit is further configured to execute the set of instructions to:
- initiate a notification prompt on a graphical user interface of the computing device in response to identifying the set of characters in the transcription,
- display a play button and a download button on the notification prompt,
- play the segment of the media file comprising the set of characters in response to the user selecting the play button, and
- download the segment of the media file comprising the set of characters in response to the user selecting the download button.

* * * * *